No. 660,717. Patented Oct. 30, 1900.
W. C. BARBER & C. W. FURNER.
STRIPED CAKE MAKING MACHINE.
(Application filed Aug. 18, 1900.)

(No Model.) 2 Sheets—Sheet 1.

Witnesses:
Wilhelm Vogt
Thomas M. Smith

Inventors:
Walter C. Barber
Charles W. Furner
By J. Walter Douglas
Attorney

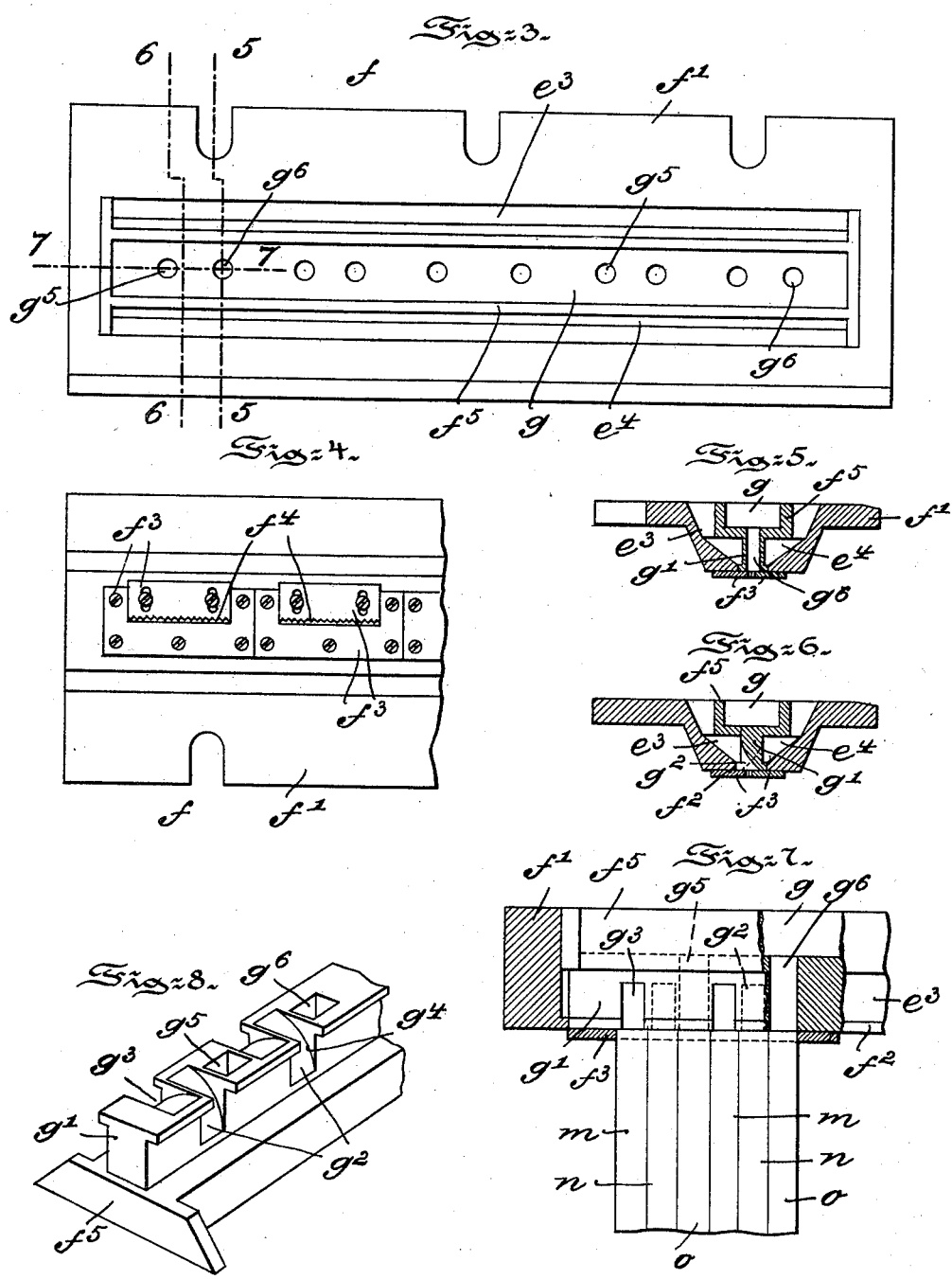

UNITED STATES PATENT OFFICE.

WALTER C. BARBER AND CHARLES W. FURNER, OF PHILADELPHIA, PENNSYLVANIA.

STRIPED-CAKE-MAKING MACHINE.

SPECIFICATION forming part of Letters Patent No. 660,717, dated October 30, 1900.

Application filed August 18, 1900. Serial No. 27,243. (No model.)

*To all whom it may concern:*

Be it known that we, WALTER C. BARBER and CHARLES W. FURNER, citizens of the United States, residing at the city of Philadelphia, in the county of Philadelphia and State of Pennsylvania, have invented certain new and useful Improvements in Striped-Cake-Making Machines, of which the following is a specification.

Our invention has relation to a machine for forming doughs of varying colors and materials into sheets or cakes in which each dough appears in stripes connected with adjacent stripes formed by the other doughs, and in such connection it relates to the construction and arrangement of such a machine.

The principal object of our invention is to provide a machine wherein three different doughs may be formed into a sheet or cake in which each dough appears as a distinctive stripe united to an adjacent stripe of another dough, the stripes being arranged side by side and not superposed.

Our invention, stated in general terms, consists of a striped-cake-making machine constructed and arranged in substantially the manner hereinafter described and claimed.

The nature and scope of our invention will be more fully understood from the following description, taken in connection with the accompanying drawings, forming part hereof, in which—

Figure 1:
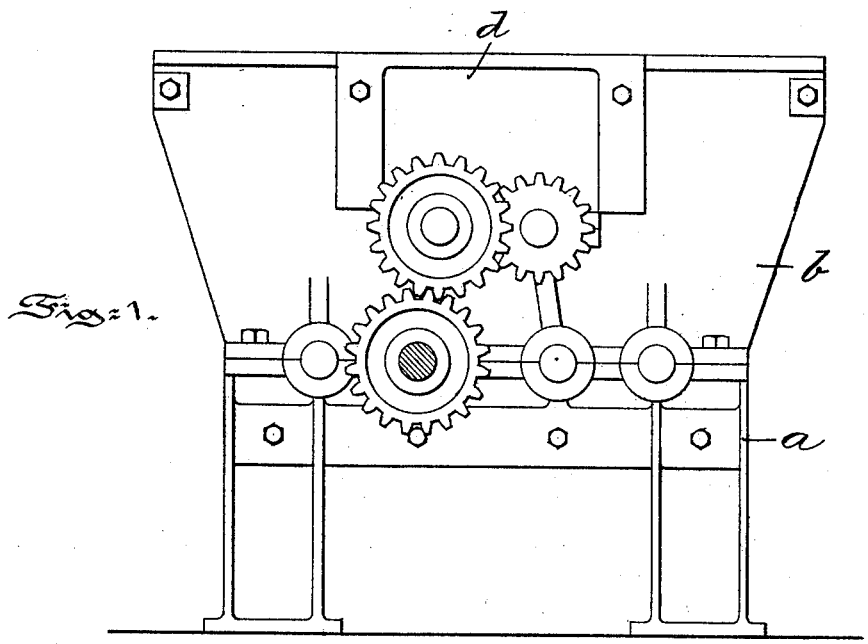
Figure 2:
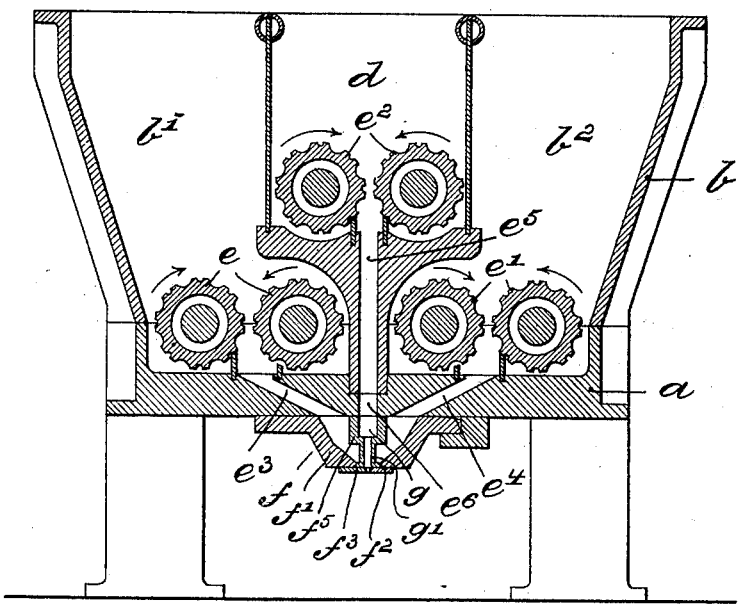

Figure 1 is a front elevational view of a machine embodying the main features of our invention. Fig. 2 is a longitudinal sectional view of Fig. 1. Fig. 3 is an enlarged top or plan view of the sheet-forming die. Fig. 4 is an underneath plan of one end of said die. Figs. 5 and 6 are cross-sectional views taken, respectively, on the lines 5 5 and 6 6 of Fig. 3. Fig. 7 is a transverse sectional view taken on the line 7 7 of Fig. 3, showing the formation of a striped cake or sheet by the die; and Fig. 8 is a perspective view of one end of the interior member of the sheet-forming die.

Referring to the drawings, the machine comprises three main parts or sections—namely, a base or frame $a$, in which the die is removably supported, the main hopper $b$, supported upon the base $a$, and an auxiliary hopper $d$, supported by the main hopper $b$ and extending downward therein to divide the same into three compartments $b'$, $b^2$, and $d$. Within each compartment $b'$, $b^2$, and $d$ thus formed is arranged a set of feed-rolls $e$, $e'$, and $e^2$, the surfaces of which are preferably longitudinally or otherwise grooved or ridged. Below each of the rolls $e$ and the rolls $e'$ and in the frame $a$, which forms the floor for the compartments $b'$ and $b^2$, are arranged slanting passages or ducts $e^3$ and $e^4$, leading to the sheet-forming die $f$. Below the rolls $e^2$ and in the base of the compartment $d$ is likewise arranged a passage-way or duct $e^5$, registering with a similar passage-way or duct $e^6$, formed in the frame $a$ between the two inclined ways or ducts $e^3$ and $e^4$. All the feed-rolls $e$, $e'$, and $e^2$ are positively driven and rotate in the direction indicated by the arrows in Fig. 2 to force the dough in the respective compartments $b'$, $b^2$, and $d$ to and through the ways or ducts $e^3$, $e^4$, and $e^6$. Below the frame $a$ and directly beneath the ducts $e^3$, $e^4$, and $e^6$ is located the sheet-forming die $f$, which consists of two members or parts. One member or part $f'$ is trough-shaped, having inclined sides and bottom, forming continuations of the ways or ducts $e^3$ and $e^4$, and having at its base an oblong opening $f^2$, which is covered on the base of the part $f'$ by gage-plates $f^3$, which gage or measure the thickness of the sheet issuing from the die. Each gage-plate $f^3$, by preference, has a serrated or notched edge $f^4$, between which and one edge of the slot or opening $f^2$ the sheet escapes. The gage-plate $f^3$ is capable of adjustment so that its edge $f^4$ may approach toward or recede from the edge of the opening $f^2$ to decrease or increase the thickness of the sheet issuing from said opening. The second or interior member $f^5$ of the die is shaped substantially as shown in Figs. 5, 6, and 8—that is, it has a longitudinal upper box portion $g$, arranged in alinement with the duct or way $e^6$, and a depending portion $g'$, which fits into the opening $f^2$ in the base of the member $f'$. The depending portion $g'$ does not completely close the opening $f^2$, for the reason that the sides are cut away, as at $g^2$ and $g^3$, to form passage-ways arranged on alternate sides, one face $g^4$ of each way $g^2$ or $g^3$ being preferably curved. The way $g^2$ forms a curved duct leading from the way or duct $e^3$ to the opening $f^2$, and the way $g^3$ forms a corresponding duct leading from the way or duct $e^4$ to the opening $f^2$. As will be plainly seen from Figs. 3 and 8, the depending portion of the member $f^5$ is also vertically perforated by openings arranged in sets of two, $g^5$ and $g^6$. These openings, while they are preferably round at the base of the box $g$, are preferably square or oblong as they emerge from the bottom of the depending portion $g'$, although they may, if desired, be square or oblong throughout. The oppositely-arranged curved ways $g^2$ and $g^3$ are arranged in sets of two, which sets are separated from each other by an opening $g^5$ or an opening $g^6$, as clearly illustrated in Fig. 8. It follows from this arrangement that the dough from the compartments $b'$ and $b^2$ is forced into the ducts $e^3$ and $e^4$ and passes in sheets along through the inclined side and base of the member $f'$ until they reach the curved ways $g^2$ and $g^3$, which separate the sheets into the strips $m$ and $n$, and are forced into the opening $f^2$ and between the edge of the opening and the gage-plate $f^3$. At the same time the dough from the compartment $d$ is forced into the ducts $e^5$ and $e^6$ and into the box $g$, from which it passes in strips $o$ by the openings $g^5$ and $g^6$ to the space between the gage-plate $f^3$ and the edge of the opening $f^2$. The slot or opening $f^2$ forms all the strips $m$, $n$, and $o$ into a sheet, as clearly illustrated in Fig. 7, in which sheet the strips appear side by side as stripes and are not superposed.

Having thus described the nature and object of our invention, what we claim as new, and desire to secure by Letters Patent, is—

1. In a machine of the character described, a hopper divided into a plurality of compartments, a set of feed-rolls arranged in each compartment, a separate passage-way leading from each compartment, and a sheet-forming die communicating with each passage-way and adapted to successively separate the materials entering the die into strips arranged side by side and to form the strips into a striped sheet, substantially as and for the purposes described.

2. In a machine of the character described, in combination with a plurality of compartments adapted to receive doughs of varying color or material and means for feeding the doughs from said compartments in separate sheets, of a sheet-forming die consisting of two members, whereof one is adapted to receive certain of the sheets and the other the remaining sheets, both of said members coacting to first separate the various sheets into strips and to then form the strips into a striped sheet, substantially as and for the purposes described.

In testimony whereof we have hereunto set our signatures in the presence of two subscribing witnesses.

WALTER C. BARBER.
CHAS. W. FURNER.

Witnesses:
J. WALTER DOUGLASS,
THOMAS M. SMITH.